April 23, 1946.  J. A. GITS  2,399,016
DISPENSING DEVICE
Filed Aug. 2, 1943  6 Sheets-Sheet 1

INVENTOR.
Joseph A. Gits
BY
Theus, Olsen, Meckenburger
Atty's.

April 23, 1946.  J. A. GITS  2,399,016
DISPENSING DEVICE
Filed Aug. 2, 1943  6 Sheets-Sheet 3

INVENTOR.
Joseph A. Gits
BY
Attys.

April 23, 1946.  J. A. GITS  2,399,016
DISPENSING DEVICE
Filed Aug. 2, 1943   6 Sheets-Sheet 4

Patented Apr. 23, 1946

2,399,016

UNITED STATES PATENT OFFICE 2,399,016

DISPENSING DEVICE

Joseph A. Gits, Chicago, Ill., assignor to West Disinfecting Company, Long Island City, N. Y., a corporation of New York Application August 2, 1943, Serial No. 497,007

7 Claims. (Cl. 222—153)

This invention relates to dispensing devices particularly adapted to discharge finely divided material and more particularly to dispensing devices especially designed to discharge granulated soap and to be provided with a hand operated discharge valve that may dispense a predetermined quantity of soap on each operation.

In dispensers of this character, it is highly desirable that the parts be made and assembled in a simple and inexpensive manner so that each installation will represent a minimum investment and will be capable of efficient operation over a reasonable period of time and be relatively inexpensive to maintain. Moreover, it is essential that the structure, which is provided, be capable of discharging the material in a finely divided state and that the material be kept from clogging the valve at the discharge orifice. It seems that prior art devices, although suggesting solutions of one kind or another, incorporated mechanism that failed to solve the problem satisfactorily, and, while these devices were used, they were neither simple to manufacture, efficient nor accurate in the control of the discharge of the material.

One of the objects of the invention resides, therefore, in the provision of certain novel features producing advantageous results both in the manufacture and in the use of a dispenser of the character herein disclosed whereby an exceptionally simple and inexpensive structure is provided that is easy to manufacture and maintain, and which efficiently operates constantly to provide a uniform discharge of material each time the handle is operated.

A further object of the invention resides in the provision of a novel form of cover and locking means therefor in a dispenser of this type and a novel mode of attachment of the bowl to the wall, or other mounting on which it is placed, whereby the usual expensive equipment used heretofore is eliminated and a simple and practical form is provided.

A still further object of the invention is to provide in a dispenser of the type herein disclosed a novel form of plastic body or bowl and a novel form of valve, agitator and cap therefor, also of plastic material, whereby the valve members and an agitator may be seated as a unit in the body and operated by a handle novelly assembled to the valve and projecting through the body, and the cap may be attached by a simple but effective form of locking means.

The invention is also directed to the specific form of valve that is provided at the discharge orifice to control the amount of material dispensed on each operation. Preferably, a plurality of seats are formed in the wall of the bowl to receive a number of relatively movable apertured disks and an agitator all connected as a unit and operated by a handle, certain of the disks being novelly designed to be tightly seated and the movable disk and agitator being loosely seated but connected together so that they will be rotated by the handle to disturb the material and cause it to move first from the apertures of the upper disk in measured amounts through the apertures of the movable intermediate disk to the apertures in the lower disk and then out through the discharge orifice.

Other objects and advantages of the invention will be apparent from the following detail description when taken in connection with the accompanying drawings which form a part hereof.

The dispensing device illustrated in the drawings comprises a novel form of plastic body or bowl 1 open at the top and bottom, there being provided a cap 2 for the top and a valve 3 controlling the amount of material dispensed through the open bottom designated herein as the discharge orifice 5. The top edge of bowl 1 is formed to provide a reduced upstanding flange 6 and an outer shoulder 7 for cooperating with an annular recess 8 in the bottom edge of cap 2 and a shoulder 9 for seating upon shoulder 7. This forms a tightly sealed connection between cap 2 and bowl 1 to prevent the entrance of moisture that would tend to cause the granulated soap to cake and not flow freely when valve 3 is operated. Cap 2 may also be made of plastic material so that the tendency of the plastic material to cold flow will keep these cooperating parts in tight relation to maintain this effective seal.

Figures 3, 4, 5, 10:
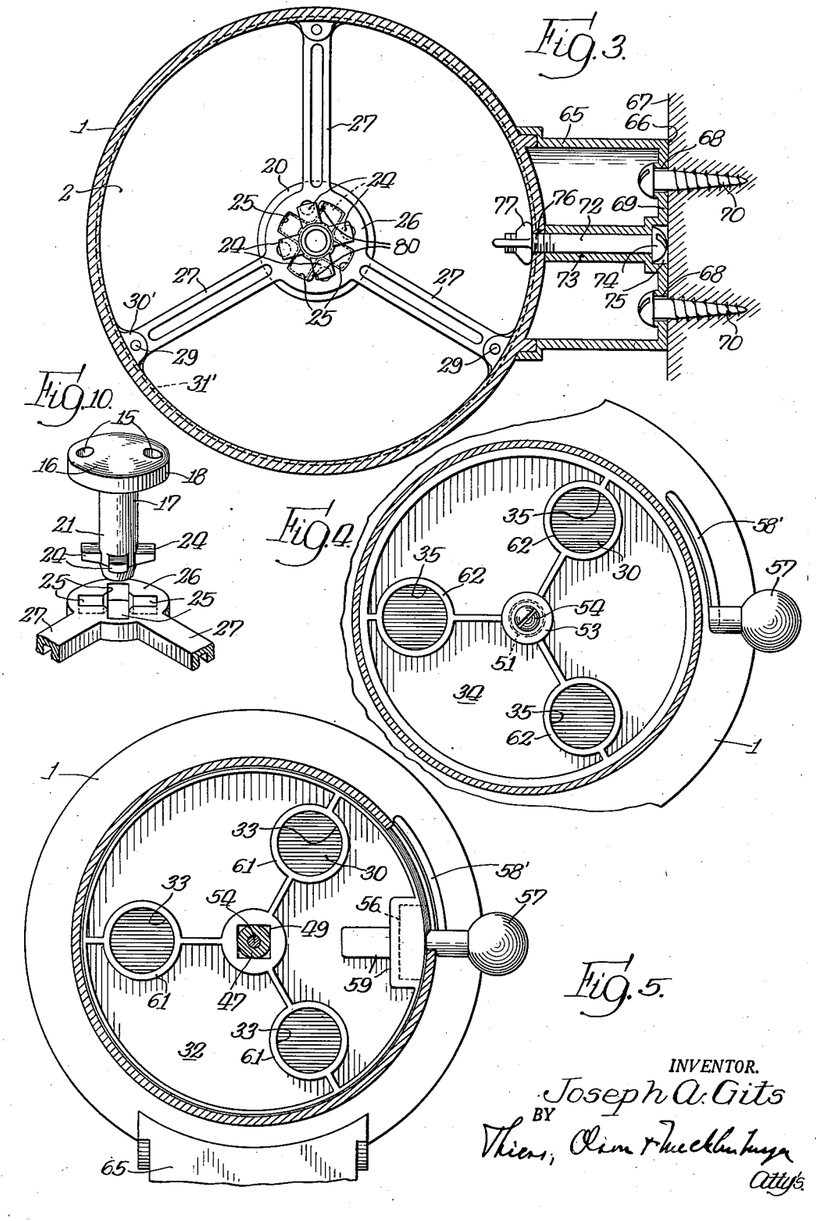
Fig. 3 is a horizontal sectional view through the device and taken along line 3—3 of Fig. 1.
Fig. 4 is also a horizontal sectional view taken along line 4—4 of Fig. 1, this view illustrating the construction of the underside of the lower disk of the discharge valve.
Fig. 5 is a similar view taken along line 5—5 of Fig. 1 to illustrate the construction of the underside of the middle disk of this discharge valve.
Fig. 10 is an exploded view of the tumbler of the locking means for the cap and the portion of the frame cooperating therewith.

A novel form of key operated means 10 may be used to lock cap 2 in position and prevent unauthorized access to the interior of bowl 1. Key means 10 may comprise a novel form of key 11 having a pair of diametrically opposed key lugs 12 and 13 adapted to engage in recesses 14 and 15 formed in an exposed face 16 of a tumbler 17. Tumbler 17 is formed with a head 18 seated in a recess 19 formed in cap 2 by molding recess 19 as a depression having walls 20 that extend downwardly and inwardly to support head 18 of tumbler 17. A reduced shank 21 of tumbler 17 is guided by a wall 22 extending downwardly from the inwardly extending wall 20. A plurality of locking lugs 24 are formed on the lower end of tumbler shank 21 to extend transversely to the axis of rotation of tumbler 17. These key lugs 24 are adapted to be arranged in a predetermined pattern, as illustrated in Figs. 3 and 10, and are adapted to be inserted into and through openings 25 of corresponding contour and pattern that are formed in a frame member 26 having radial arms 27 extending to a peripheral band 28 adapted to be secured by screws 29 to a second band 30', both of these band members being seated in an annular recess 31 formed interiorly about the top edge of bowl 1. Band 30' may be fixed in recess 31' as by cementing or by the use of any suitable mechanical connection.

As stated above, cap 2 may be made of plastic material and may be slightly flexible so that it will yield when key lugs 12 and 13 of key 11 are inserted in openings 14 and 15 of tumbler 17 and the key is pressed downwardly. In this operation, the key is turned until locking lugs 24 are aligned with openings 25 in frame member 26 and are inserted into and through these openings. Further rotation of key 11 will bring lugs 24 out of registration with openings 25 below frame member 26. If slight flexibility of cap 2 is relied upon during this operation to bring lugs 24 below openings 25 in frame 26, these lugs 24 will be bindingly held against the underside of frame 26 when the pressure on key 11 is released and the key is removed. In this manner, cap 2 may be tightly held about the upper edge of bowl 1 to provide the pressure in maintaining the aforesaid desirable seal. It will be noted that lugs 12 and 13 of key 11 may be arranged in any predetermined pattern so that only individuals having key 11 may remove cover 2. Even with openings 14 and 15 being disposed diametrically opposite each other in head 18 of tumbler 17, it is impossible to rotate tumbler 17 without a key having lugs 12 and 13 oppositely disposed. The insertion of an implement in either opening 14 or 15 will not rotate tumbler 17. Both lugs 12 and 13 must be used in order to secure the necessary rotation of tumbler 17 in order to bring locking lugs 24 into registration with openings 25 to permit withdrawal of the lugs through these openings and the removal of cap 2.

Valve 3 controls the flow of the material from bowl 1 through orifice 5. It may comprise a plurality of apertured disks which, as illustrated specifically in the drawings, include an upper disk 30 having a number of apertures 31, a middle or intermediate disk 32 having a number of apertures 33, and a lower disk 34 having a number of apertures 35. These disks are nested one above the other in a predetermined relation so that apertures 33 of intermediate disk 32 will alternately align or register with either the apertures 31 of upper disk 30 or the apertures 35 of lower disk 34. Included in this arrangement is an agitator 36 having a plurality of arms 37 extending outwardly to connect with an annular rim 38.

Figure 1:
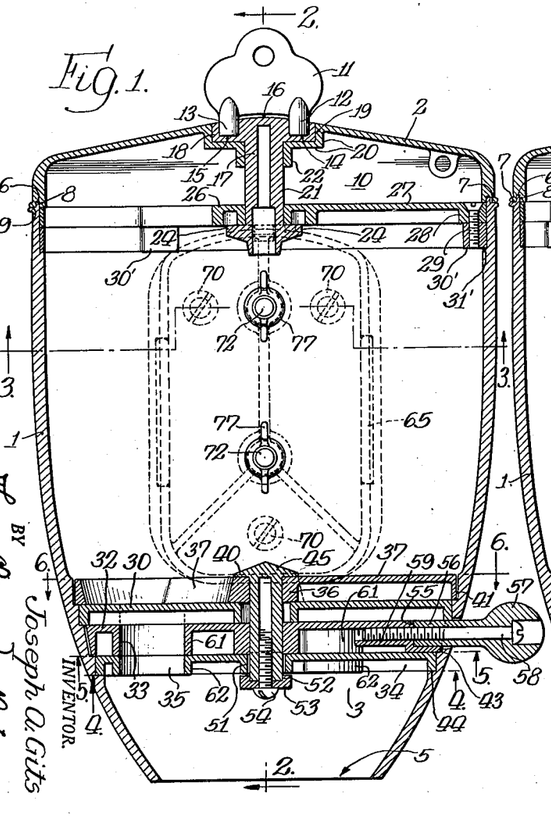
Figure 1 is a transverse sectional view of a dispensing device embodying the present invention.
Figure 2:
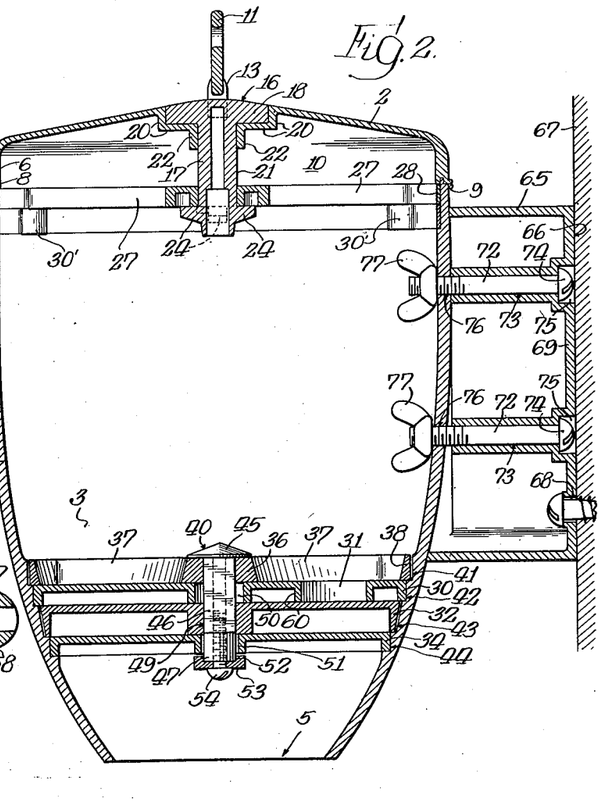
Fig. 2 is a transverse sectional view of the same device but taken at right angles to that of and along line 2—2 of Fig. 1.

Included as a part of the novel arrangement is the use of a connecting means 40 adapted to hold these parts together so that they may be inserted and carried in bowl 1 as a unit. A series of seats 41, 42, 43 and 44 are formed in the wall of bowl 1 to receive these disks and the agitator. As illustrated in Figs. 1 and 2, these recesses are novelly offset with respect to each other and are located near discharge orifice 5, and disks 30, 32 and 34 and agitator 36 are received in these seats in overlapping relation. Connector 10 consists of a head 45, a rectangular shank 46 and a lower cylindrical stud 47. Agitator 36 and middle disk 32 are provided with center openings 48 and 49, respectively, each being rectangular cross-sectionally to correspond with the cross-sectional dimensions of rectangular shank 46 of connector 40, so that when shank 46 is inserted through openings 48 and 49, agitator 36 and middle disk 32 will rotate together when either is moved (see Fig. 9). Upper disk 30 is provided with an opening 50 of a diameter larger than the cross dimension of rectangular shank 46, so that the latter may turn in opening 50 without turning upper disk 30. Lower disk 34 is provided with a center opening 51 that may be slightly larger in diameter than the diameter of the lower cylindrical stud 47 of connector 40, so that turning of this connector 40 will not rotate lower disk 34. In order to hold the parts as a unit about connector 40, the lower cylindrical stud 47 may seat in a recess 52 of a collar 53 and a bolt 54 may thread upwardly into connector 40, as illustrated cross-sectionally in Figs. 1 and 2. Middle disks 32 may be cut away at 55 and a head 56 of similar contour carrying a handle 57 may be seated in this recess 55 and held therein by a bolt 58 adapted to be passed through the handle, its shank 56 threading into an enlarged portion 59 formed on the underside of middle disk 32, as illustrated in Figs. 1 and 5. Handle 57 may operate in a slot 58' in the wall of bowl 1, this handle extending through this slot and being accessible exteriorly for operation, the stroke of this handle 57 being determined by the length of slot 58'.

A further novel feature of the invention resides in employing, in connection with the connection and arrangement of the disks and agitator as aforesaid, seats 42 and 44 of a size that tightly receives upper and lower disks 30 and 34, so that these disks will be frictionally held against rotation in these seats and in employing seats 41 and 43 of a size that will loosely receive agitator 36 and middle disk 32. Agitator 36 and middle disk 32 rotate together by means of connection 40 when handle 57 is moved back and forth in slot 58'. The construction of connector 40 with respect to the manner in which it carries agitator 36 and the three disks 30, 32 and 34 permits upper disks 30 and lower disk 34 to be held tightly upon either seats 42 and 44 and against rotation by this frictional engagement when agitator 36 and middle disk 32 are actuated. Although any other form of seating for the agitator and the disks may be used and even a mechanical connection employed to prevent movement of the upper and lower disk 30 and 34, the present arrangement affords a very simple and inexpensive construction that effectively accomplishes its purpose and provides a structure capable of effective operation over a period of time without experiencing wear and requiring repairing.

Inasmuch as agitator 36 and disks 30, 32 and 34 may also be molded of plastic material, apertures 31, 33 and 35 are provided with downwardly extending annular walls 60, 61 and 62, and the disks may be provided with downwardly extending peripheral flanges that rest upon these seats 42, 43 and 44. The depth of the peripheral flange of each disk and the depth of the apertures of flanges 60, 61 and 62 depend upon the relative depth of disks 30, 32 and 34. The volumetric capacity of aperture 33 and the number employed in middle disk 32 determine the quantity of material discharged by each operation of handle 57. It will be observed that the depth of apertures 31 and 35 is not as great as the depth of aperture 33. It is not necessary that the depth of the apertures of the three plates bear any particular relation to each other because only the amount of soap filling apertures 33 will be discharged by each operation of handle 57.

Figure 6:
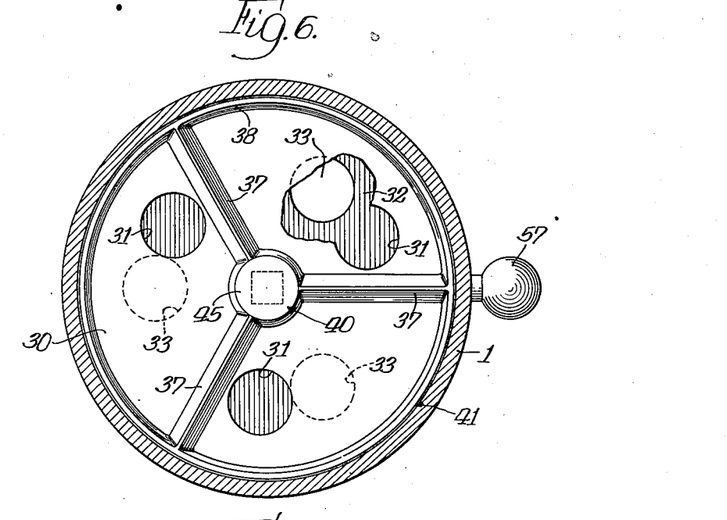
Fig. 6 is a similar view taken along line 6—6 of Fig. 1 to illustrate the position of the agitator as it has been moved to disturb the material and push the same into the apertures of the upper disk, the intermediate disk being actuated by this movement to align its apertures with the apertures of the lower disk to effect a discharge of a predetermined amount of material from the orifice of the bowl.
Figure 7:
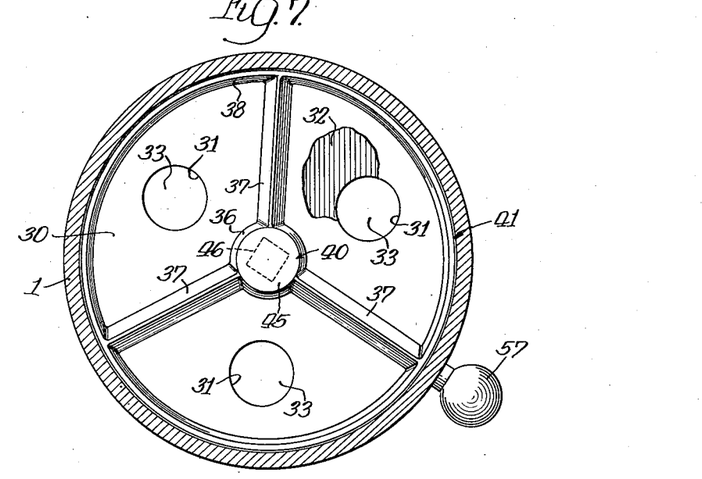
Fig. 7 is a similar view but illustrating the agitator moved to its other position and the apertures of the middle disk actuated by this movement to align with the apertures of the upper disk.

When handle 57 is in the position illustrated in Fig. 7, apertures 33 of intermediate disk 32 register with apertures 31 in top plate 30 and are filled with the granulated soap in bowl 1 that falls through apertures 31. Rotation of handle 57 to the position shown in Fig. 6 brings apertures 33 then into registration with apertures 35 of bottom plate 34 so that the material carried by the middle plate in these apertures 33 will drop through apertures 35 in lower plate 34 to the discharge orifice 5. Each movement of handle 57 causes arms 37 of agitator 36 to oscillate and disturb the material within bowl 1, it being noted in Fig. 6 that when handle 57 is in the position bringing apertures 33 into registration with apertures 35, these agitator arms 37 have completed their movement of pushing the material toward and into the apertures 31 of upper disk 30. If there is any tendency of the material to agglomerate or become lumpy, agitator arms 37 will tend to disturb the material sufficiently to break up the lumps and push the material into apertures 31.

Figures 8, 9:
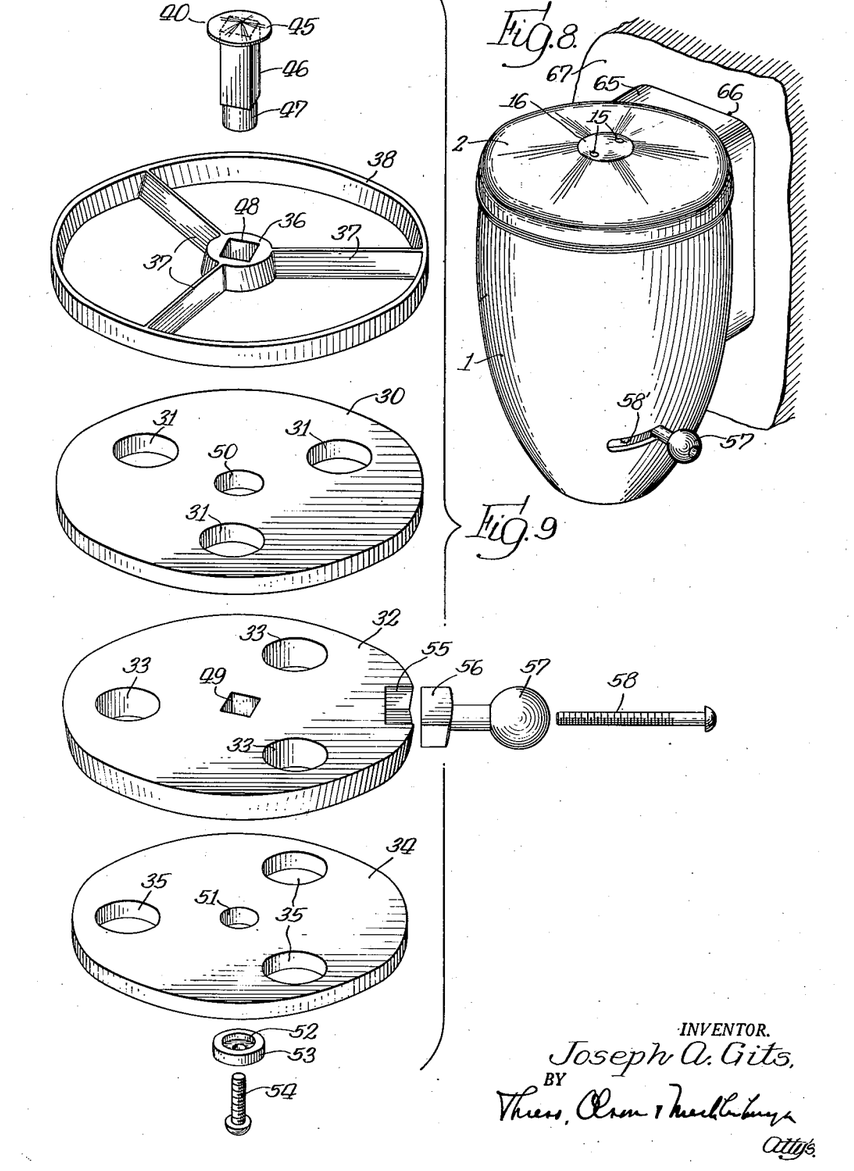
Fig. 8 is a perspective view of the dispensing device embodying the invention to illustrate how it is mounted against a wall or like support.
Fig. 9 is an exploded view of the parts comprising the valve and the agitator.

A novel type of mounting bracket 65 preventing removal of bowl 1 from its mounting by an unauthorized person is shown in Figs. 2, 3 and 8. Bracket 65 is somewhat rectangular in formation and is provided with a face 66 that may conform to the contour of the surface 67 against which bowl 1 is adapted to be mounted. In the drawings, surface 67 is illustrated as flat but it will be understood that it may be a curved surface or any type, and that face 66 may be made to conform to the configuration thereof. Openings 68 are provided in rear wall 69 of face 66 to receive mounting screws 70. Bracket 65 is mounted against wall 67 before bowl 1 is secured thereto, this being accomplished by screws 70 being inserted in openings 68 from the inside of the bracket and then driven into wall 67. Before this is done, however, bolts 72 are inserted in openings 73 so that their threaded ends extend away from bracket 65 and their heads 74 lie in recesses 75 formed in the front face 66 of wall 69. Bowl 1 is then mounted by passing the projecting threaded ends of bolts 72 through openings 76 in the wall of bowl 1. Wing nuts 77 are then threaded into position to hold bowl 1 upon these bolts 72. It will be noted that these wing nuts 77 must be threaded upon bolts 72 while cover 2 is removed. In this way, it is impossible to remove bowl 1 without the use of key 11 which locks the cover in position.

A feature that may be provided in connection with the key means heretofore described is the use of stop means 80 that will prevent key 11 from being turned too far and allow each locking lug 24 to align with the next opening 25, which might cause these lugs to snap free without effecting a locking operation. This locking means comprises shoulders 80 on the lower face of frame 26 serving to restrict the movement of key 11, and hence, lugs 24, to a clockwise direction, when cap 2 is locked in position, so as to prevent each lug 24 from moving into the next opening 25. Thus, the key 11 may be turned clockwise to effect locking but limited in its movement by these lugs 80 and moved counterclockwise to effect unlocking.

Although it is not essential to various novel features of the invention, it will be noted that the structure described may be novelly made of plastic parts except for such parts as screws 29, 54, 58, 70 and 72. Thus, the use of metal is reduced to a minimum and the cost of labor in the assembly of the parts has likewise been reduced to a minimum because the plastic parts have been molded in a manner to eliminate much of the assembly time heretofore required when the parts were made of metal.

A further eembodiment of the invention is illustrated in Figs. 11 to 17, inclusive. The agitator 90 of this form is molded in the form of a plurality of radially extending legs 91 having their ends flared as indicated at 92. In cross section, each leg 91 is somewhat triangular.

Figures 11, 12, 14:
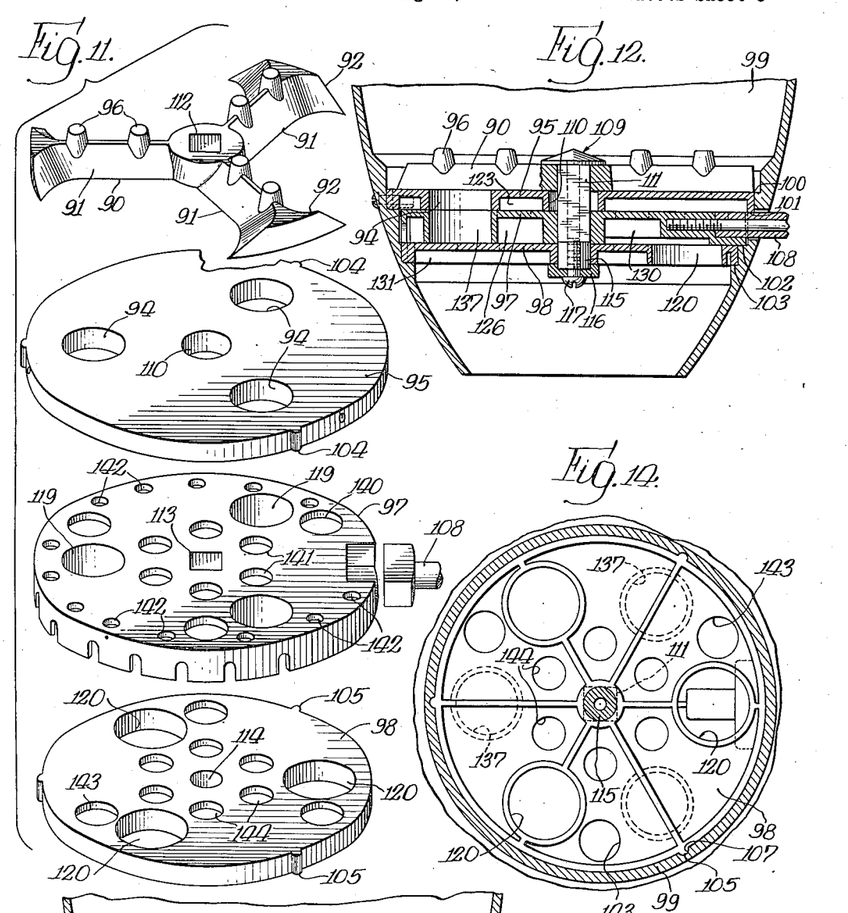
Fig. 11 is an exploded view of an agitator and valve disks of slightly different construction.
Fig. 12 is a transverse section of these disks and agitator assembled and seated in the body of a dispenser.
Fig. 14 is a bottom view of the lower disk in a position of non-dispensing relation with the middle disk.
Figure 13:
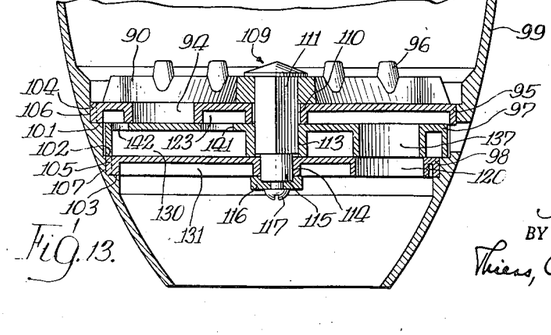
Fig. 13 is a transverse section of the same assembly, but taken through a different plane.

One of the faces forms the base and the other two faces form the side faces of each leg, so that, when the agitator is moved it will effect a sweeping action to push the soap into the path of openings 94 of top plate 95. Upstanding pins 96 are also provided upon legs 91 to break up the granules of soap that may tend to cake in the area surrounding the agitator. A middle plate 97 and a lower plate 98, together with top plate 95, serve to comprise the valve assembly that is adapted to be mounted in the bottom of bowl 99 of this embodiment. As illustrated in Figs. 12 and 13 seats 100, 101, 102 and 103 similar to seats 41 to 44, inclusive, are formed on the inside wall of bowl 99 to receive agitator 90 and disks 95, 97 and 98. Instead of relying upon a frictional grip, I prefer in this instance to use vertical ribs 104 disposed in spaced relation about the periphery of top plate 95 and similar ribs 105 about the periphery of bottom plate 98 that will lie in grooves 106 and 107 formed in seats 101 and 103, respectively, as shown in Fig. 13. Thus, it is apparent that either frictional or mechanical means may be used to keep top and bottom plates 95 and 98 from rotating when handle 108 is oscillated in its slot in the wall of bowl 99.

A connector 109 similar to connector 40 is used to hold these plates and the agitator together. Central opening 110 in top plate 95 is circular and larger in diameter than the square shank portion 111 of connector 109. Central opening 112 in agitator 90 and central opening 113 in middle plate 97 are square and receive square shank portion 111 of connector 109 in driving relation whereby rotary movement imparted to this middle plate 97 by operation of handle 108 will be transmitted to the agitator and cause the same to rotate with the middle plate. Central opening 114 in bottom plate 98 is larger in diameter than the diameter of the reduced cylindrical portion 115 of shank 109 so that with upper plate 95 this bottom plate will not rotate but will remain locked to the wall of the bowl by the ribs 104 and 105 lying in grooves 106 and 107. A cap 116 fits over the terminal of the reduced portion 115 and a screw 117 passes through this cap and threads into this reduced portion.

Figure 15:
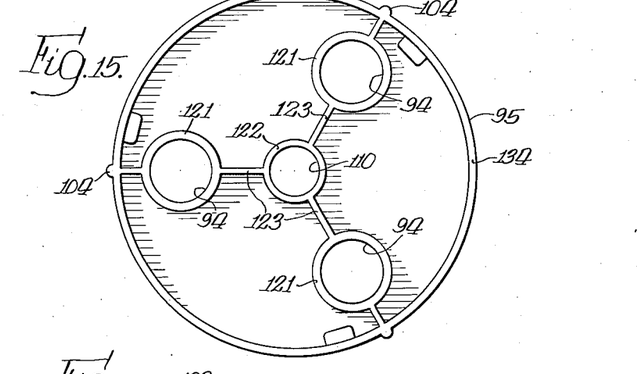
Fig. 15 is a bottom view of the upper disk or plate to show the construction of flanges and webbing employed on the lower face of this upper disk.
Figure 16:
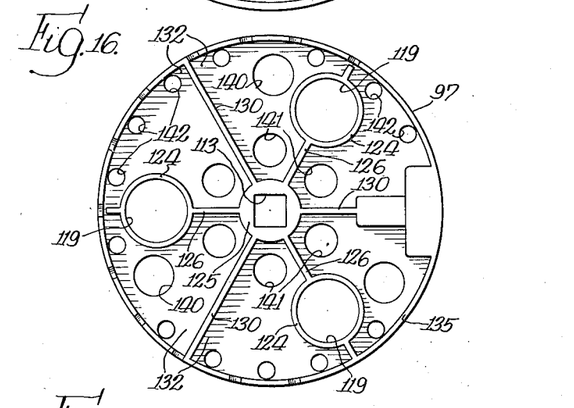
Fig. 16 is a similar view of the middle disk to illustrate a similar construction and to show partitions, which, in effect, divide the underside of the middle disk into separate pockets or compartments.
Figure 17:
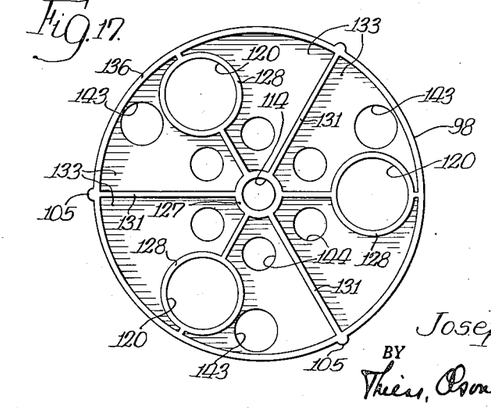
Fig. 17 is a similar view of the lower disk.

Upper and middle plates 95 and 97 are in a position as shown in Figs. 11 and 12 with openings 94 in upper plate 95 registering with openings 119 in middle plate 97 and dispensing therefrom a charge of soap into the latter openings. Movement of the middle plate 97 by actuation of handle 108 brings these latter openings 119 into register with openigs 120 in bottom plate 98, as shown in Fig. 13, whereupon the charge of soap is allowed to drop to and through the open bottom of the bowl. Figs. 15, 16 and 17 are bottom views of the three plates. They illustrate the construction of these plates and show particularly the flange and web arrangement employed on the bottom side. Openings 94 and 110 have flanges 121 and 122 extending the depth of the upper plate 95, which flanges are connected by webs 123. Openings 119 and 113 likewise have flanges 124 and 125 extending the depth of middle plate 97 that are connected by webs 126. Openings 114 and 120 also have flanges 127 and 128 extending the depth of lower plate 98 that are connected by webs 129. In addition to these webs, both middle and lower plates 97 and 98 have spacing walls 130 and 131 which divide the area of these plates into pockets or compartments 132 and 133, respectively. The three plates are also provided with depending annular skirts or flanges designated as 134, 135 and 136. The bottom of these flanges rests upon the respective seats 101, 102 and 103, while ribs 104 and 105 of the upper and lower plates are formed upon the outer surface of flanges 134 and 136.

The amount of the charge that is dispensed upon each operation of handle 108 will depend upon the depth of flanges 124 of openings 119 of the middle plate. These flanges 124 form in fact pockets 137 which are filled each time they are moved to register with openings 94 in the upper plate. The soap in these pockets is then carried over the upper face of the lower plate until the pockets register with openings 120. It will be apparent from Fig. 13 that it will be easy for soap to accumulate between the upper and middle plates. To prevent clogging, openings 140 smaller than openings 119 are provided slightly in advance of the latter and a series of smaller openings 141 are provided about the central portion of the middle plate. Also, to prevent any tendency for soap to pile up against the inside of flange 134 of the top plate, a series of small openings 142 are provided in the middle plate. Openings 143 and 144 are also provided in the lower plate for similar purposes. Thus, it is impossible for the soap in its granular form to accumulate undesirably between plates so as to cause the middle plate to turn with difficulty and experience sticking after a period of time.

Like in the former embodiment, all the parts may be made of plastic except screw 117 and those employed to mount handle 108 and the bowl to the wall substantially in the same manner as shown in Fig. 2. Hence, the parts may be quickly and inexpensively made with a minimum of labor and assembled in a simple way whereby the device may be effectively used as a dispenser of granulated or powdered material over a long period of time without requiring repair or replacement.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In a dispenser for finely divided material, a bowl having an orifice therein to discharge said material, a cap for said bowl, a frame secured to the wall of said bowl near its upper part, and locking means between said cap and said frame, said locking means having an exposed face provided with key openings of predetermined spacing and comprising a rotatable portion extending through said cap from said exposed face, lugs on said portion transversely disposed with respect to the axis of rotation of said portion, openings in said frame corresponding to the pattern of said lugs, and key means insertible in said spaced openings in said exposed face, said cap being slightly yieldable to flex axially inwardly to cause said lugs to enter and pass through said frame openings when depressed, the rotation of said extending portion by said key means causing said lugs to move out of registration with said frame openings and to be held in said non-registering relation by the action of said cap tending to return to normal position after being flexed.

2. In a dispenser for finely divided material, a bowl having an orifice therein to discharge said material, a cap formed of plastic material and being slightly flexible axially when depressed, a frame in said bowl, locking means between said cap and said frame, a tumbler seated in said cap and extending therethrough in the direction of said frame, lugs on said tumbler transversely disposed with respect to the axis of rotation of said tumbler, said frame carrying a portion having openings substantially of the same pattern as said lugs whereby to receive said lugs when inserted therein, the flexing of said cap causing said lugs to pass through said openings, and key means for rotating said tumbler to bring said lugs out of registration with said openings.

3. In a dispenser for finely divided material, a bowl having an orifice therein to discharge said material, a valve to control the discharge from said orifice, said valve comprising a plurality of superimposed disks having apertures therein for the passage of said material therethrough to said orifice, an agitator above said disks, a connector to mount said disks and said agitator as a unit, said disks and said agitator having openings therein for said connector, said connector having a portion of cylindrical formation and a portion provided with a plurality of faces, the openings of said agitator and one of said disks being of the same cross sectional configuration as said multiface portion of said connector whereby both said agitator and said disk are in driven relation with each other, the openings of said other disks being cylindrical, one of said cylindrical openings being of greater dimension than said multiface portion of said connector whereby its disk is free to move relative to said connector, the other of said cylindrical openings being of greater diameter than said cylindrical portion of said connector whereby its disk is likewise free to move relative to said connector.

4. In a dispenser for finely divided material, a bottomless bowl for the material, a valve forming a closure across the inside of the bowl near the lower end and controlling the discharge of said material therefrom, said valve comprising a series of relatively movable apertured disks, depending flanges surrounding the apertures in said disks and engaging the next disk, seats formed in the inside wall of said bowl to receive the edges of said disks, a flange or skirt on the periphery of each disk engaging one of said seats, said flange or skirt being of a depth equal to the depth of said depending flanges surrounding said disk apertures whereby to space said disks from each other and form pockets therebetween; handle means to operate said disks to cause a measured discharge of the material from the bowl, and means to clean said pockets of any material accumulating in said pockets.

5. In a dispenser for finely divided material, a bowl for the material, a valve controlling the discharge of material from the bowl, said valve comprising a series of disks of relatively thin material having apertures therein for the passage of the material, flanges depending from said disks and surrounding the said apertures, said flanges engaging the face of the adjacent disk, peripheral flanges on the disks, seats formed on the inside wall of the bowl to receive said peripheral flanges, said peripheral flanges being of a depth equal to said depending flanges surrounding said apertures whereby to space said disks from each other and form pockets therebetween, said disks having apertures other than the flanged ones to permit the discharge of material accumulating in said pockets between the disks.

6. In a dispensing device for finely divided material, a container bowl for a supply of the material having an orifice therein to discharge said material, a valve in said bowl adjacent said orifice, said valve comprising a plurality of rotating and non-rotating superimposed disks, said disks having apertures therein adapted alternately to align with each other between adjacent disks to discharge predetermined amounts of said material when relative rotation between said disks is effected, means for restraining the movement of the non-rotating disks, means for actuating said rotating disks, spacing flanges on said disks to keep said disks in spaced relation to each other whereby to form pockets therebetween, flanges projecting into said pockets about said apertures of at least the intermediate and upper disks to predetermine the amount of the discharge upon each actuation of said disks, and said disks having additional apertures placing said pockets between said disks in communication with each other when said disks are actuated whereby to cleanse said pockets of any accumulation of said material.

7. In a dispensing device for finely divided material, a container bowl for a supply of the material having an orifice therein to discharge said material, a valve in said bowl adjacent said orifice, said valve comprising a plurality of disks having relative rotation therebetween, means for actuating said disks to effect said relative rotation, said disks having a plurality of apertures therein, certain of said apertures aligning with each other to effect a discharge of material therethrough upon actuation of said disks, flanges for spacing said disks apart to form pockets therebetween, additional flanges projecting into said pockets about said discharge apertures to predetermine the amount of the discharge upon each actuation of said disks and tending to prevent accumulation between said disks in said pockets, the remaining apertures in said disks clearing said pockets of any accumulations upon actuation of said disks.

JOSEPH A. GITS.